United States Patent [19]
Johnson

[11] 4,186,891
[45] Feb. 5, 1980

[54] ENDLESS TAPE WINDING DEVICE

[75] Inventor: Joseph R. Johnson, La Place, La.

[73] Assignee: Electro Mag Sales, La Place, La.

[21] Appl. No.: 844,469

[22] Filed: Oct. 21, 1977

Related U.S. Application Data

[63] Continuation-in-part of Ser. No. 736,277, Oct. 27, 1976, Pat. No. 4,066,221.

[51] Int. Cl.² ............................................. B65H 17/48
[52] U.S. Cl. ............................... 242/55.19 R; 352/128
[58] Field of Search ................. 242/55.19 R, 55.19 A, 242/55.18; 352/28, 128

[56] References Cited

U.S. PATENT DOCUMENTS

| | | | |
|---|---|---|---|
| 2,255,724 | 9/1941 | Sunnell | 242/55.19 R |
| 3,481,551 | 12/1969 | Stellman | 242/55.19 A |
| 3,661,337 | 5/1972 | Burth | 242/55.19 R |

*Primary Examiner*—Billy S. Taylor
*Attorney, Agent, or Firm*—Christie, Parker & Hale

[57] ABSTRACT

A turntable is rotated to wind the tape of a taped program thereon in equal lengths per revolution thereof. Each equal winding forces the preceeding windings inwardly on the turntable to assume progressively curving paths as the respective windings recede from the periphery of the turntable. Pressure pads are equally spaced around the periphery of the turntable and rotate therewith. The pressure pads extend radially, and frictionally engage the top edges of the tape windings which follow increasingly curved paths therebetween as the equal windings are forced inwardly by succeeding equal windings. The ends of the tape are connected leaving a portion of the closed loop formed thereby for engagement by associated apparatus and rendition thereby of the taped program. Since all of the windings on the turntable are of the same length per rotation thereof, tape can be simultaneously wound on and off the turntable as it is rotated with no slippage and friction between windings, and as the beginning and end of the taped program are joined, the program can be repeated for as many performances as desired, with only monitoring for mechanical failures required.

7 Claims, 10 Drawing Figures

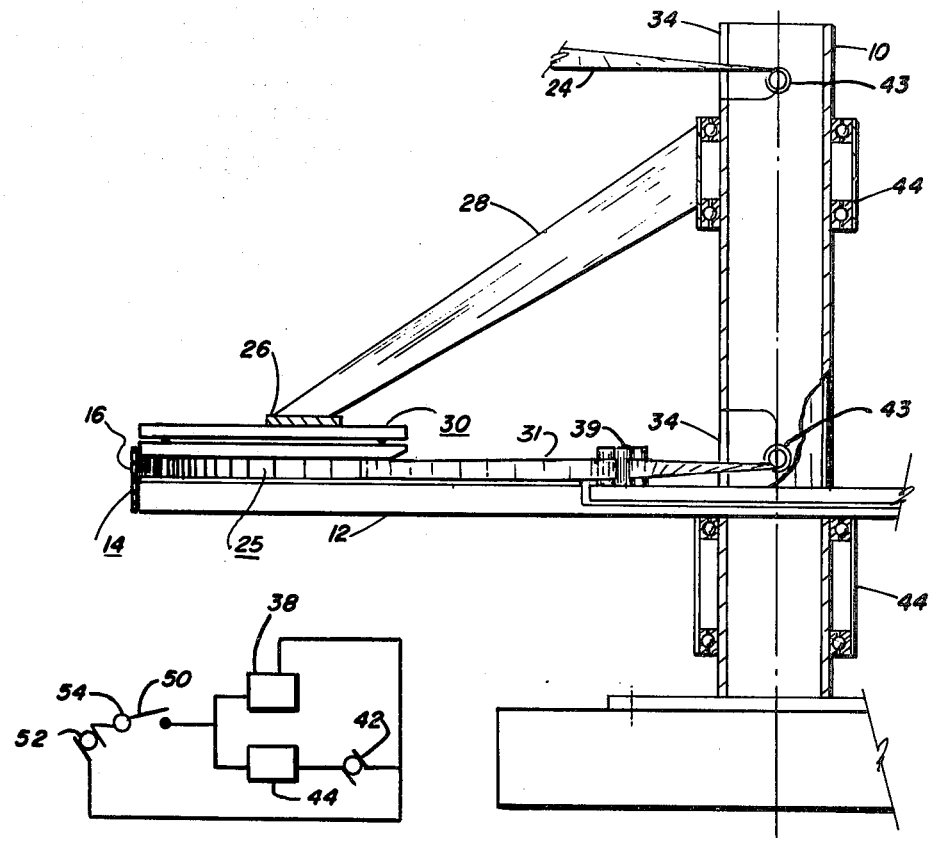
FIG. 5
FIG. 3
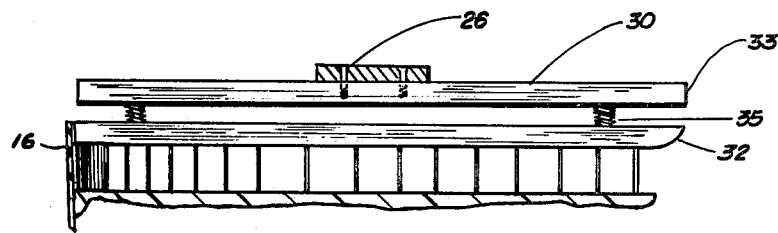
FIG. 4

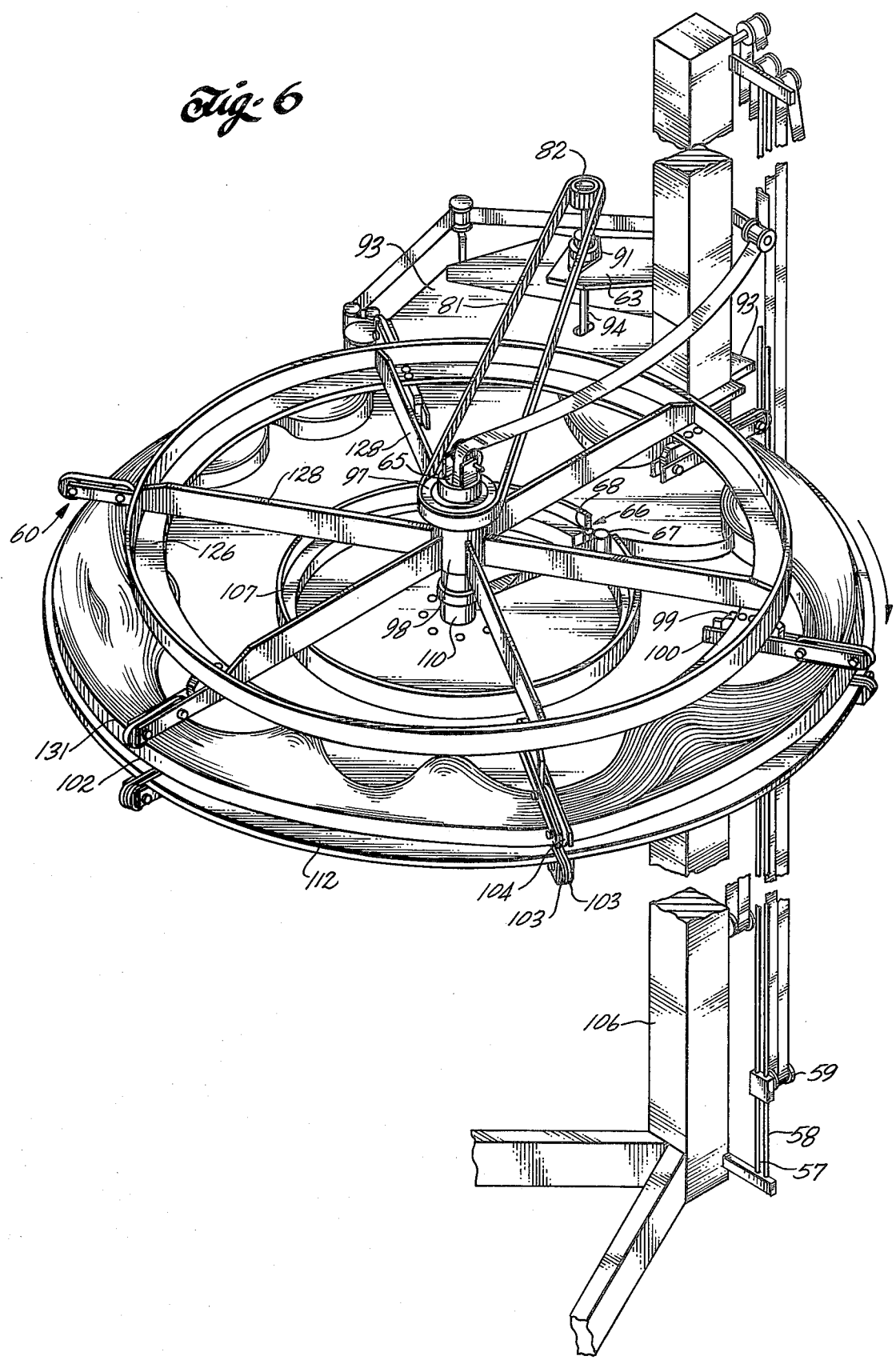

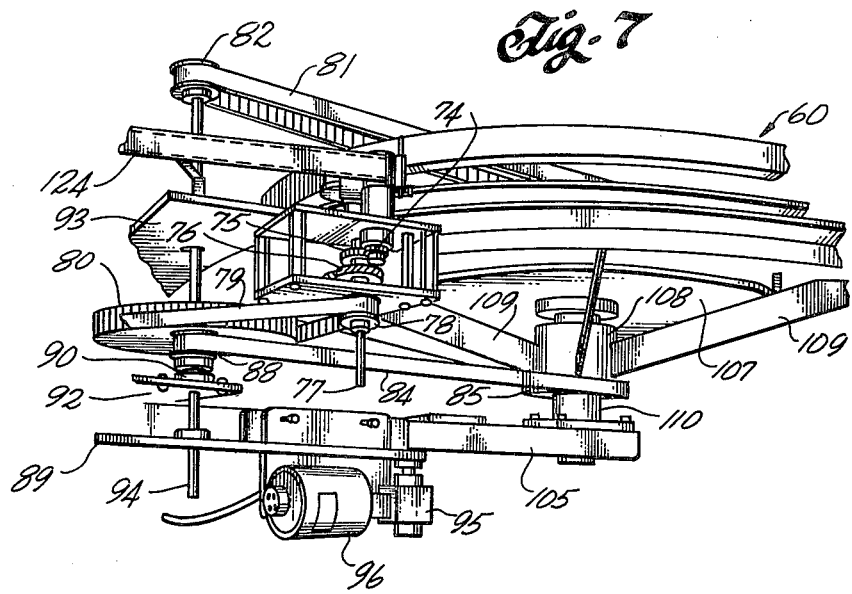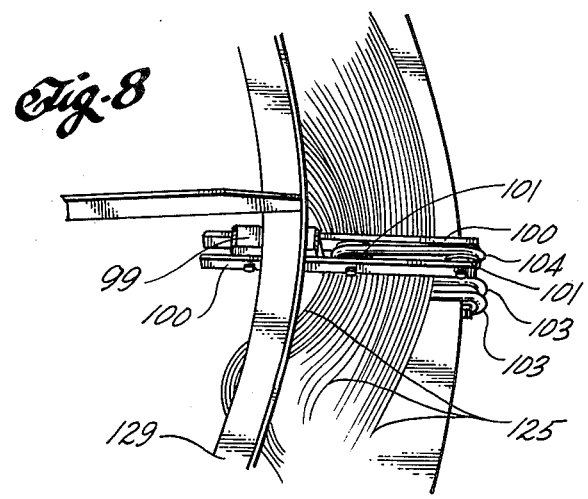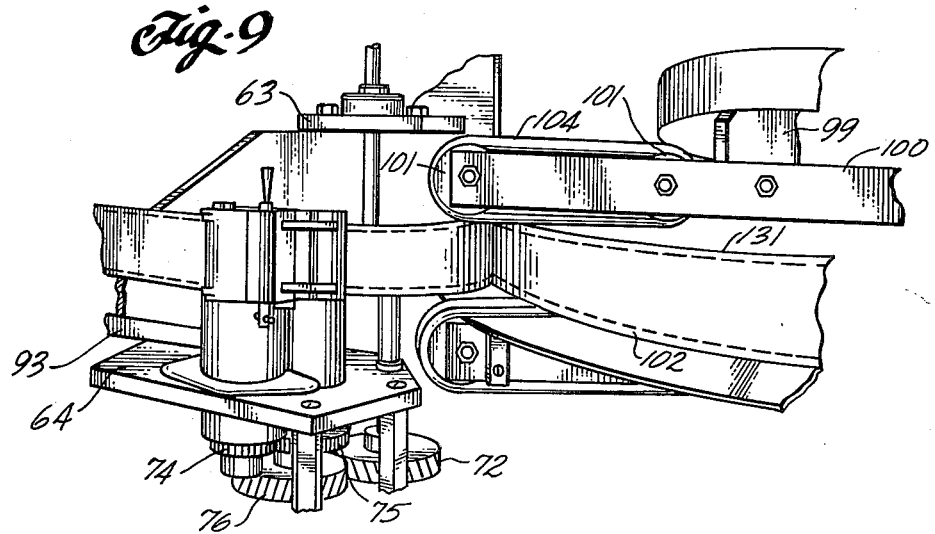

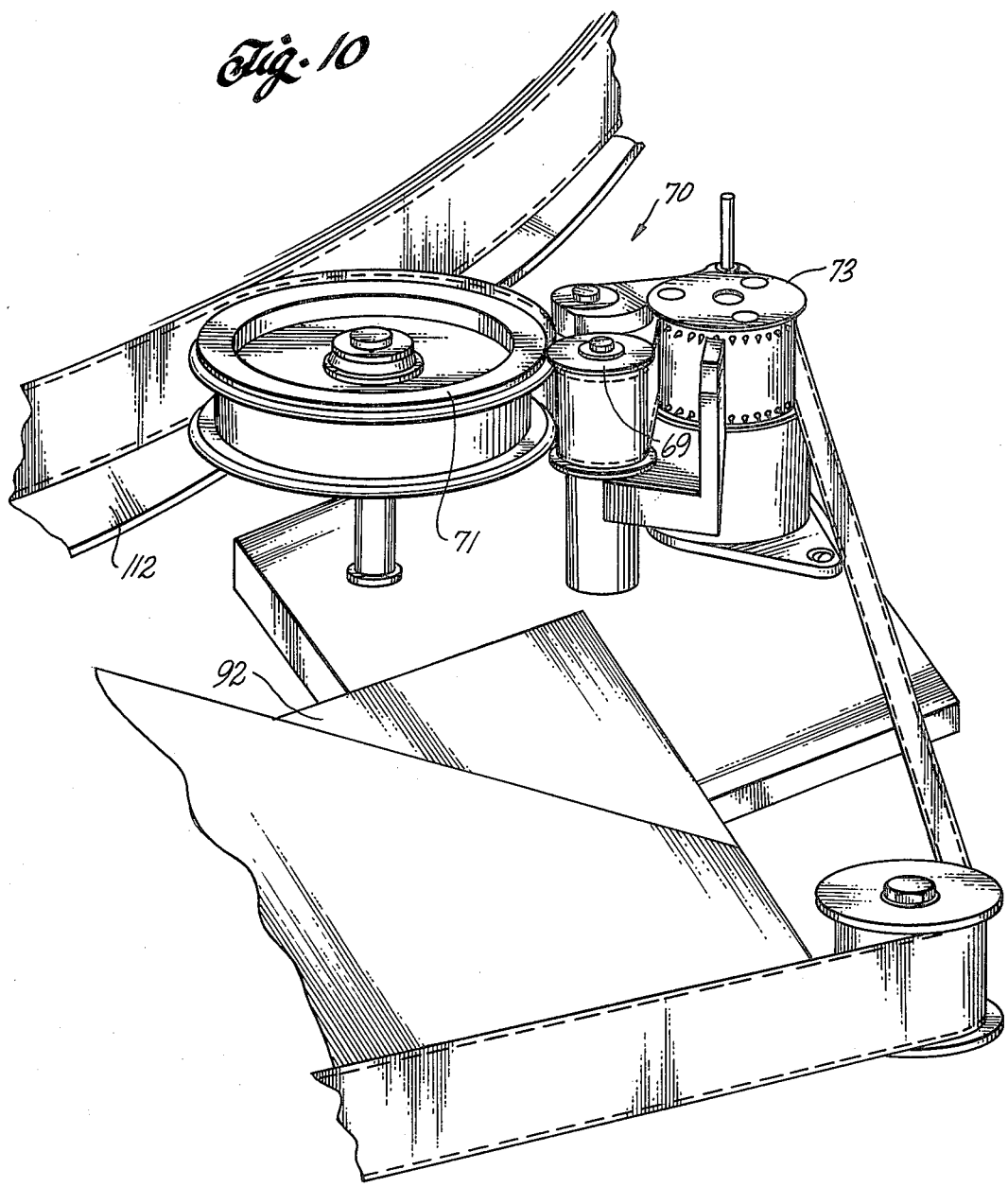

ENDLESS TAPE WINDING DEVICE

CROSS-REFERENCE TO RELATED APPLICATIONS

This application is a continuation-in-part of U.S. patent application Ser. No. 736,277, filed Oct. 27, 1976 now U.S. Pat. No. 4,066,221 issued Jan. 3, 1978.

BACKGROUND OF THE INVENTION

The invention relates generally to a method of and apparatus for the loading and use of turntables in the rendition of taped programs, and more particularly in the loading and use of a single turntable on which the tape of a taped program is wound on and off simultaneously in equal amounts per revolution of the turntable.

Heretofore, the tape of a taped program of the length of a movie, television show, or musical show, has been loaded on a turntable by winding it from the center outward, thereby varying the length of tape per revolution of the turntable directly with the radius of the winding. The outer end of the tape is led through an associated apparatus for the rendition of the taped program, and out to be rewound from center on a second turntable. When the program ends, it can be replayed from the second turntable back onto the first turntable. The two turntables are required because they must turn at varying speeds to deliver and take up tape at a constant linear rate from turntable windings of varying radii.

Also, in the prior art, winding tape from the center of a reel through a cooperating apparatus for the rendition of the taped program and peripherally re-winding it back on the same reel has necessarily been confined to very short lengths of tape loosely wound to allow for slippage and friction between windings due to the reel turning several times to reel off from the center the same length of tape that is peripherally reeled on in less than one revolution.

SUMMARY OF THE INVENTION

An object of the invention is to provide a method of and apparatus for loading and unloading the tape of a taped program on a turntable in equal amounts per revolution of the turntable.

Another object of the invention is to provide a method of simultaneously feeding the tape of a taped program from a turntable loaded according to the invention into an associated apparatus for rendering the taped program and thence rewinding it back on the same continuous renditions of the taped program.

Another object of the invention is to provide a method of and apparatus for automating all succeeding renditions of a taped program after the first rendition in accordance with any desired schedule of time.

BRIEF DESCRIPTION OF THE SEVERAL VIEWS OF THE DRAWINGS

FIG. 3 is an enlarged fragmentary side view of the invention with several parts shown in cross-section;
FIG. 4 is an enlarged fragmentary view of a part of the invention as shown in FIG. 3;
FIG. 5 is a schematic diagram of an energizing circuit common to the invention and associated rendition apparatus;
FIG. 6 is a perspective view of an alternative embodiment of the invention depicting the tape handling system thereof;
FIG. 7 is a perspective view of the improved drive means of the tape handling system of FIG. 6;
FIG. 8 is an enlarged view of the means for holding the tape on edge against the turntable;
FIG. 9 is an enlarged view of the tape holding means and drive means for putting the tape onto the turntable;
and
FIG. 10 is an enlarged view of the means for applying the tape to the turntable.

DESCRIPTION OF INVENTION

Figure 1:
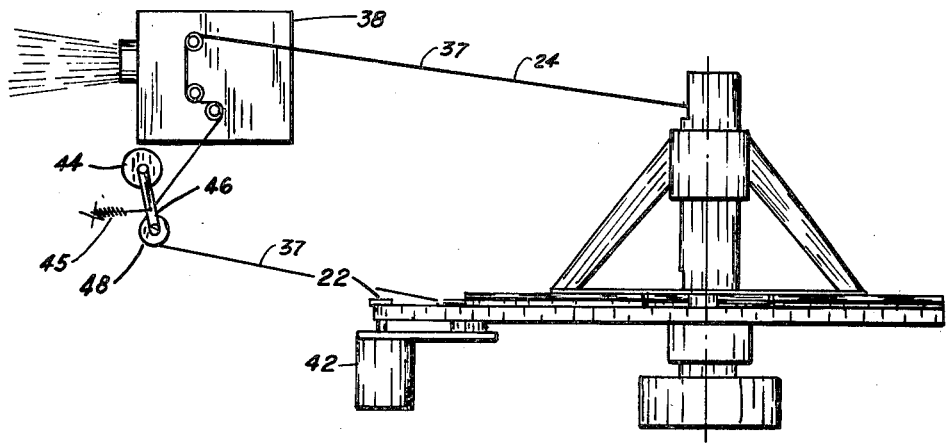
FIG. 1 is a diagrammatic side view of the invention.
Figure 2:
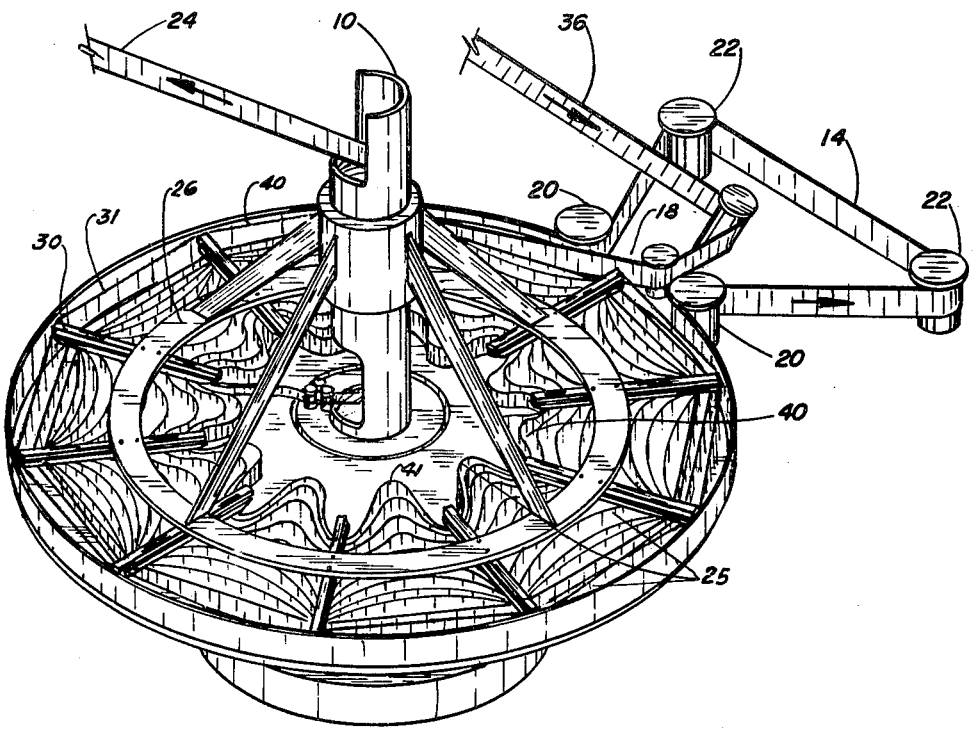
FIG. 2 is a three-dimensional view from top and side of a turntable of the invention.

Referring to the FIGS. 1-4, the invention comprises a hollow stationary shaft 10 on which is mounted for rotation a turntable 12. A wide, flat belt 14 is mounted peripherally around turntable 12, and drives it in rotation. Belt 14 extends upwardly from turntable 12 to define a peripheral flange 16 around most of the circumference of turntable 12 leaving a space 18 defined between two spacing rollers 20 mounted adjacent to turntable 12 and spaced peripherally apart and on which belt 14 travels out and around drive rollers 22 to permit the feeding of tape 24 of a taped program onto turntable 12 in equal windings 25 thereon as made against flange 16. A ring 26 is suspensively supported above turntable 12 by a plurality of radial arms 28 mounted for rotation around stationary shaft 10. A larger plurality of pressure pads 30 are fixed to the side of ring 26 to frictionally engage upper edges 31 of windings 25 with a spring biased lower part 32. Windings 25 curve equally inward on turntable 12 between pressure pads 30 to follow progressively more fluted or scalloped paths (see FIG. 2). Lower part 32 of a pressure pad 30 are biased downwardly by spring 35 mounted between upperpart 33 and lower part 32. As shown in the drawing, the end of each pad 30 engages belt 14 along the peripheral flange 16, so that the pressure pads 30 and ring 26 are rotated in synchronism with the turntable 12.

Stationary shaft 10 defines holes 34 above and below radial arm 28 through which tape 24 is led off turntable 12 to be connected to the end 36 of tape 24 to form a closed loop, all of which, except for a bight 37, is wound in turntable 12. The bight is left free for feeding through an associated taped program apparatus 38 and back onto the turntable. The tape is directed through guides 39 for preventing slack and around rollers 43 mounted in said shaft respectively adjacent said holes 34 in said shaft.

By rotating the turntable tape 24 is wound on table 12 under pads 30. At first, each winding 25 comprises a series of chords 40 between pressure pads 30. Each succeeding winding 25 pushes the preceeding winding 25 into progressively more curved paths 41 as the equal lengths of tape per revolution of the turntable between radially oriented pressure pads 30 fits between progressively less space between pads 30 as the center of table 12 is approached.

Tape 24 is simultaneously fed on and off turntable 12 and through cooperative apparatus 38 for the rendition of taped program in equal amounts of tape per revolution of turntable 12 and thus without slippage and friction between the windings 25 on table 12.

A motor 42 drives rollers 22 to rotate turntable 12 by means of belt 14 and feed the tape on table 12. Associated apparatus 38 draws tape 24 off the turntable at requisite speed. Motor 42 is controlled by a rheostat 44 operable by a swinging arm 46 pivoted thereto, and having a roller 48 engaging the free bight 37 of the tape 24 between associated apparatus 38 and turntable 12 regulating the speed of motor 42 to maintain a tension on the tape commensurate with the rate of withdrawl by associated apparatus 38.

Motor 42 and taped-program-apparatus 38 can be scheduled to turn off after every completed passage of the taped program therearound and through, or to finally cutoff after every third, or more, or less completed passages for a period of time until the next days' schedule of running the taped program. Thus, the running of the taped program after winding on turntable 12 is entirely automatic, to leave only monitoring for possible tape breakage and taped-program-apparatus failure which can be accomplished from a single station for any desired number of performances in any desired number of performance places.

For purposes of the application "tape" includes motion picture film, video tape, and magnetic tape, and a "taped program" includes any transcription thereon for rendition therefrom.

The invention in cooperation with the associated rendition apparatus 38 can be automated by adding an off-on switch 50 to a common energizing circuit 52, therefor, that is operable by a time responsive element 54, whereby a schedule of daily renditions of the taped program can be set on said time responsive element 54 for daily repetitions of said schedule for an indefinite period (see FIG. 5).

An improved version of the tape handling system of the invention is shown in FIGS. 6-10, inclusive. As shown in these figures, the improved system differs from the system of FIGS. 1-4, inclusive in:

(1) The drive means for the turntable;
(2) The means for holding the tape on edge against the turntable;
(3) The drive means for the holding means; and
(4) The means feeding the tape onto the turntable.

As shown in FIGS. 6 and 7, a turntable 112 is mounted for rotation around a stationary shaft 110 through a plurality of radial arms 109, attached between the under side of the turntable 112 and a bearing collar 108 around the shaft 110. The turntable 112 is mounted to rotate around an inner flanged plate 107, which is immovably attached to the shaft 110 to facilitate in the removal of the tape 124 from the inner winding on the turntable. The turntable 112 is suspended through the action of the shaft 110 and the radial arms 109 and collar 108 at a selected distance above the floor by the attachment of the shaft 110 to a carriage 106 through a plate 105.

The tape 124 to be wound on and off simultaneously from the turntable 112 in equal amounts per revolution of the turntable is advantageously held on edge against the turntable 112 by a tape holding means 60 consisting of a plurality of continuous loop belts 104 which frictionally engage the upper edges 131 of windings 125. Belts 104 are positioned above and in line with a radius of the turntable 112 and cooperate with a pair of opposing continuous loop belts 103 which are positioned one on each side and contiguous to the radius and in frictional engagement with the lower edge 102 of the tape 124. The belts 104 engage the upper edge of the tape 124 in a plane that is orthogonal to the surface of the turntable 112 and includes the associated radius of the turntable. In practice, the position of the pair of belts and the single belt can be reversed to provide the means for holding the tape on edge against the turntable.

Each end of the belt 104 rotates around a pulley 101 held in place by opposing and cooperating plates 100 secured by an appropriate means to a ring 129 by way of a mounting block 99. Ring 129 is suspensively supported above turntable 112 by a plurality of radial arms 128 mounted for rotation around stationary shaft 110. The radial arms 128 are secured to a bearing collar 98 to which is attached a pulley 97 for rotatably driving the tape holding means. The belts 104, ring 129, arms 128, and collar 98 constitute the tape holding means 60.

Attached to plate 105 is a drive motor 96 which drives the turntable 112, the tape holding means 60, and a tape feed means 70 through a gearbox 95 and cooperating pulleys on a shaft 94. The shaft 94 is mounted to the carriage 106 through plates 92, 93, and 63. The shaft is journalled by bearing blocks 91 and 90. Shaft 94 is coupled to the output of the gearbox 95 through a belt 89 and cooperating pulleys (not shown) around the shaft 94 and the output of the gearbox 95. The turntable 112 is driven from the shaft 94 by a pulley 88 attached to the shaft, a pulley 85 attached to the bearing collar 108, and a drive belt 84 therebetween.

The tape holder 60 is driven by the combination of a pulley 82 attached to and driven by shaft 94, a belt 81 driven by pulley 82, and pulley 97 driven by belt 81. The tape holder 60 and turntable 112 are driven at the same speed in synchronism so that there is zero relative velocity between the belts 104 and each point on the turntable along the associated radius immediately below each point on the belt. The belts are freely moveable along and adjacent to each associated radius and permit relatively free movement of the wound tape along each radius. At the same time, the belts 103 and 104 cooperate to prevent circumferential movement of the tape.

The means for applying the tape 124 to the turntable 112 or the tape feed means 70 (FIG. 10), supported by a plate 64 attached to plate 93 is driven as shown in FIGS. 7 and 9. Attached to the shaft 94 is a pulley 80 for driving the tape feed means 70. The tape feed means 70 is driven through a belt 79 and a pulley 78 attached to shaft 77. Also, attached to the shaft is a gear 76 and a gear 75. Gear 75 engages a gear 74 for driving a sprocket 73, which is advantageously used when the tape is photographic film. Gear 76 drives gear 72 which rotates a drive wheel 71, which applies the tape to the turntable 112. The tape is pulled into the tape feed means 70 by the sprocket 73 and is pulled around an idler wheel 69 by the drive wheel 71. The speed of the sprocket 73 and the drive wheel 71 are related to the speed of the turntable 112 and the speed of removal of the inner winding from the center of the turntable 112 so that a length of winding equal to the length of winding removed from the center for each revolution of the turntable 112 is put on as an outer winding for each revolution of the turntable 112. The drive wheel 71 is advantageously driven at a slightly higher speed than that required to accommodate the tape supplied by the sprocket 73, so that the tape is effectually pulled through the sprocket 73 by the drive wheel 71. The drive wheel 71 is positioned relative to the outer periphery of the turntable 112, so that each new winding of the tape 112 is inserted between the belts 103 and 104 of the tape holder 60. By driving the drive wheel at a slightly higher speed, the tape is also applied to the turntable 112 with essentially no drag or friction between windings on the turntable 112 and the new outer winding.

The tension of the tape off the turntable for the tape handling apparatus of FIGS. 6 through 10 may be maintained the same as the tension of the tape in the apparatus of FIGS. 1 through 5.

The tape removed from the apparatus is advantageously taken from the inner winding at a point that causes the least friction and slippage between the tape being removed and the winding left on the turntable.

As shown in FIG. 6, the tape 124 is taken from the inner winding and is fed through a pair of rollers 67 and 68 mounted in an opening 66 of the flange of the flanged plate 107. The tape 124 enters an opening (not shown) in the stationary shaft 110 above the turntable 112 and is removed from the top of the shaft 110 through an opening 65.

Advantageously, the tape is taken from the inner winding at a point slightly beyond the opening 66 in the direction of rotation. This point may be adjusted by adjusting the bight by movement of a roller 59, slidably moveable on rods 58 and 57, and clamped at the desired position on the rods 58 and 57.

What is claimed is:

1. A tape-handling apparatus comprising:
a turntable rotatable about an axis;
means for holding a tape wound on the turntable on edge against the turntable along a plurality of radii of the turntable and permitting movement of the tape radially along each of the plurality of radii while preventing circumferential movement of the tape across each of the plurality of radii, the holding means comprising a radially extending rotatable continuous-loop belt associated with each radius and engaging one edge of the windings of the tape along the radius, and a pair of radially extending rotatable continuous-loop belts engaging the other edge of the winding of the tape on each side of the radius of the single belt and cooperating with the single belt to prevent circumferential movement across the radius;
means for mounting the belts remote from the surface of the turntable for rotation about the axis of the turntable;
means for rotating the turntable and the mounting means in synchronism; and
means for applying selected lengths of tape per revolution near the outer edge of the turntable while progressively displacing preceding windings inwardly by the succeeding windings.

2. A tape-handling apparatus comprising:
a turntable rotatable about an axis;
means for holding a tape wound on the turntable on edge against the turntable along a plurality of radii of the turntable and permitting movement of the tape radially along each of the plurality of radii while preventing circumferential movement of the tape across each of the plurality of radii, the holding means comprising at least one radially extending rotatable continuous-loop belt on each side of the tape at each radius and cooperating to prevent circumferential movement across the radius while permitting radial movement;
means for mounting the belts remote from the surface of the turntable for rotation about the axis of the turntable; and
means for rotating the turntable and the mounting means in synchronism.

3. A tape-handling apparatus in accordance with claim 2, the holding means further comprising a pair of belts on the turntable side of the tape with the belts being on each side of the radius associated with the single belt on top of the tape.

4. A tape-handling apparatus in accordance with claim 2 further comprising means for rotatably mounting each belt at the ends of the loop of each belt.

5. A tape-handling apparatus comprising:
a turntable rotatable about an axis;
means for holding a tape wound on the turntable on edge against the turntable along a plurality of radii of the turntable and permitting movement of the tape radially along each of the plurality of radii while preventing circumferential movement of the tape across each of the plurality of radii;
means for mounting the holding means for rotation about the axis of the turntable; and
means for rotating the turntable comprising a pulley attached to the bottom of the turntable about the axis of the turntable, a power source, a pulley attached to the power source, and a belt coupled between the pulley of the power source and the pulley on the turntable.

6. A tape-handling apparatus in accordance with claim 5 further comprising means for rotating the holding means about the axis of the turntable comprising a pulley attached to the holding means about the axis of the turntable; and means for driving the pulley.

7. A tape-handling apparatus comprising:
a turntable rotatable about an axis;
means for holding a tape wound on the turntable on edge against the turntable along a plurality of radii of the turntable and permitting movement of the tape radially along each of the plurality of radii while preventing circumferential movement of the tape across each of the plurality of radii;
means for mounting the holding means for rotation about the axis of the turntable in synchronism with the turntable; and
means for applying selected lengths of tape per revolution near the outer edge of the turntable while progressively displacing preceding windings inwardly by the succeeding windings, the applying means comprising a drive sprocket for drawing the tape into the applying means and a drive wheel for pulling the tape through the sprocket and positioned to apply the tape on the turntable as the outer winding thereon as the turntable rotates.

* * * * *